United States Patent
Yen

(10) Patent No.: US 9,098,660 B2
(45) Date of Patent: Aug. 4, 2015

(54) METAL INTERCONNECT MODELING

(71) Applicant: Taiwan Semiconductor Manufacturing Company, Ltd., Hsin-Chu (TW)

(72) Inventor: Hsiao-Tsung Yen, Tainan (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/902,566

(22) Filed: May 24, 2013

(65) Prior Publication Data

US 2014/0258955 A1    Sep. 11, 2014

Related U.S. Application Data

(60) Provisional application No. 61/775,778, filed on Mar. 11, 2013.

(51) Int. Cl.
*G06F 17/50* (2006.01)

(52) U.S. Cl.
CPC ........ *G06F 17/5036* (2013.01); *G06F 2217/82* (2013.01)

(58) Field of Classification Search
CPC ....... G06F 21/10; G06F 21/572; G06F 21/71; G06F 21/725; G06F 21/73; G06F 21/86; G06F 2221/2135; G06F 21/42; G06F 21/51; G06F 21/57; G06F 21/608; G06F 21/74; G06F 21/78; G06F 21/87; G06F 17/5036; G06F 17/5045; B22C 9/04; B23P 15/246; B29C 33/301; B29C 33/38; B29C 33/3835
USPC .................................................. 716/110–116
See application file for complete search history.

(56) References Cited

U.S. PATENT DOCUMENTS

| 7,954,080 | B2 | 5/2011 | Yen et al. | |
| 2004/0049756 | A1* | 3/2004 | Chopra et al. | 716/10 |
| 2007/0226659 | A1* | 9/2007 | Suaya et al. | 716/1 |
| 2010/0251191 | A1* | 9/2010 | Suaya et al. | 716/4 |

* cited by examiner

*Primary Examiner* — Binh Tat
(74) *Attorney, Agent, or Firm* — Haynes and Boone, LLP

(57) ABSTRACT

A method for modeling metal routing includes extracting physical parameters of a metal interconnect for a circuit design, determining a resistance value from a database of metal interconnects with the extracted physical parameters, the resistance value being at a maximum frequency of a frequency range to be simulated, modeling the interconnect with a symmetric lumped transmission line model, and defining a resistance value of the lumped transmission line model to be about 1.05-1.3 times the resistance value taken from the database.

20 Claims, 8 Drawing Sheets

METAL INTERCONNECT MODELING

PRIORITY DATA

This patent is a non-provisional of U.S. Ser. No. 61/775,778 filed Mar. 11, 2013, the entire disclosure of which is hereby incorporated by reference.

BACKGROUND

Integrated circuits that are formed into semiconductor substrates include multiple components such as transistors, resistors, and memory elements. These components are typically connected to one another through metal lines that are routed through multiple layers formed onto the substrate. These metal lines are often referred to as metal interconnects.

During the design phase of integrated circuits, the designer often uses a computer drafting tool to design the circuit. The next step is to design the layout of the circuit. The layout indicates how the circuit will be printed onto a substrate. During this phase of the design, it is important to understand how each of the metal interconnects will perform when carrying signals. It is particularly important to understand the behavior of signals passing through the interconnects at a wide band of frequencies. For example, it may be useful to understand the behavior of the metal interconnects at a range between 0.2 Ghz and 60 Ghz. In some cases, even higher frequencies may wish to be analyzed.

Modeling or simulation software is often used to analyze the behavior of metal interconnects before they are printed out. This allows designers to make adjustments if some aspect of the circuit does not behave as desired. Such modeling is often a time consuming and complicated process. The equations that are used to model the metal interconnects are relatively complex and thus take a lot of computing power.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
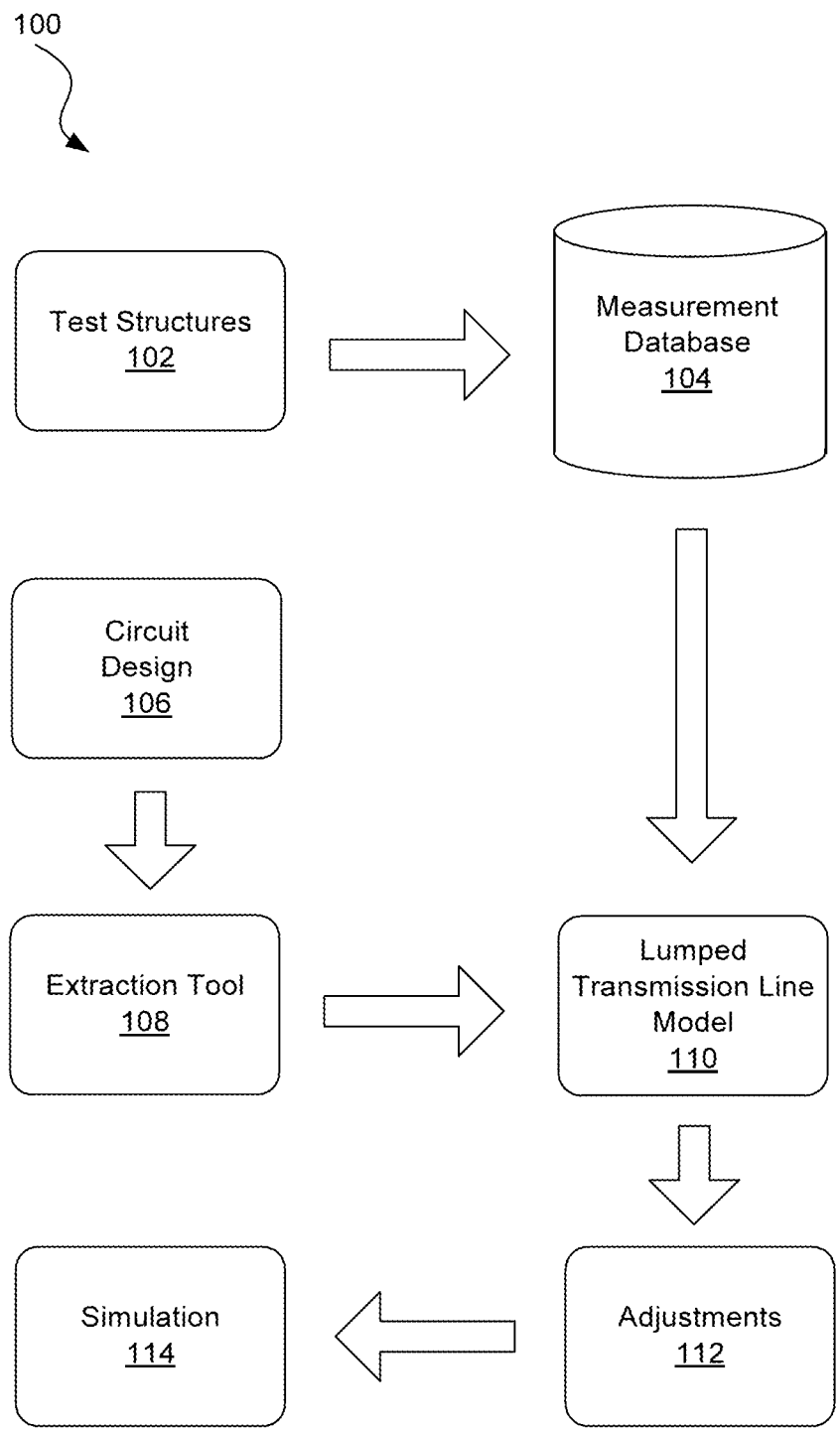
FIG. 1 is a diagram showing an illustrative overview of a process for modeling metal interconnects, according to one example of principles described herein.

FIG. 1 is a diagram 100 showing an illustrative overview of a process for modeling metal interconnects. According to certain illustrative examples, modeling often makes use of databases. For example, a number of test structures 102 that include metal interconnects having various lengths, widths, and metal schemes may be formed into a substrate. The intrinsic characteristics of these varying interconnects are then measured. Specifically, the resistance, capacitance, and inductance of these metal interconnects are measured and the data obtained from the measurements are put into a measurement database 104. Moreover, these measurements are obtained at varying frequencies.

The measurement database can be used to lookup the intrinsic characteristics of a specified metal interconnect. For example, a particular metal interconnect may have the physical parameters of a length of X, a width of Y, and is placed within a metal scheme of type Z. The database 104 may include intrinsic characteristics measured from a metal interconnect with parameters X, Y, and Z at varying frequencies. Thus, the measured capacitance, inductance, and resistance of that metal interconnect may be obtained from the measurement database 104. In some cases, the exact physical parameters desired may not be within the database 104. However, it may be that data from the database 104 is extrapolated to determine an approximate match for a metal interconnect with the desired physical parameters.

As mentioned above, a circuit designer will use a computer drafting tool to create a circuit design 106. After designing the layout of the circuit, an extraction tool 108 is used to extract the physical parameters of the metal interconnects. The physical parameters are then compared with measurements from the database 104 to determine values for use in a lumped transmission line model 110. The lumped transmission line model 110 may be of a variety of types of transmission lines including, but not limited to strip lines, microstrips, coplanar waveguides, coplanar waveguides with shielding, interconnects between devices, and other waveguides.

A lumped transmission line model is a method for modeling a transmission line using discrete components such as resistors, inductors and capacitors to represent the intrinsic characteristics of the transmission line. Various types of transmission line models may be used. According to examples described herein, a symmetric transmission line model may be used as described in further detail below.

After using the database 104 and the physical parameters extracted from the circuit design 106 to define values for the lumped transmission line model, various adjustments 112 to those values may be made. According to certain examples, these adjustments can be made to increase the accuracy of the lumped transmission line model 110. These adjustments will be described in further detail below.

After the adjustments 112 have been made, various tools may be used to simulate the circuit. For example, the circuit may be simulated using S-parameters. S-parameters are a method for modeling circuits. Specifically, the electrical properties of a circuit such as gain, return loss, reflection coefficient and amplifier stability can be expressed using S-parameters. By modeling and simulating metal interconnects as described herein, the modeling and simulation can be done more efficiently.

Figure 2:
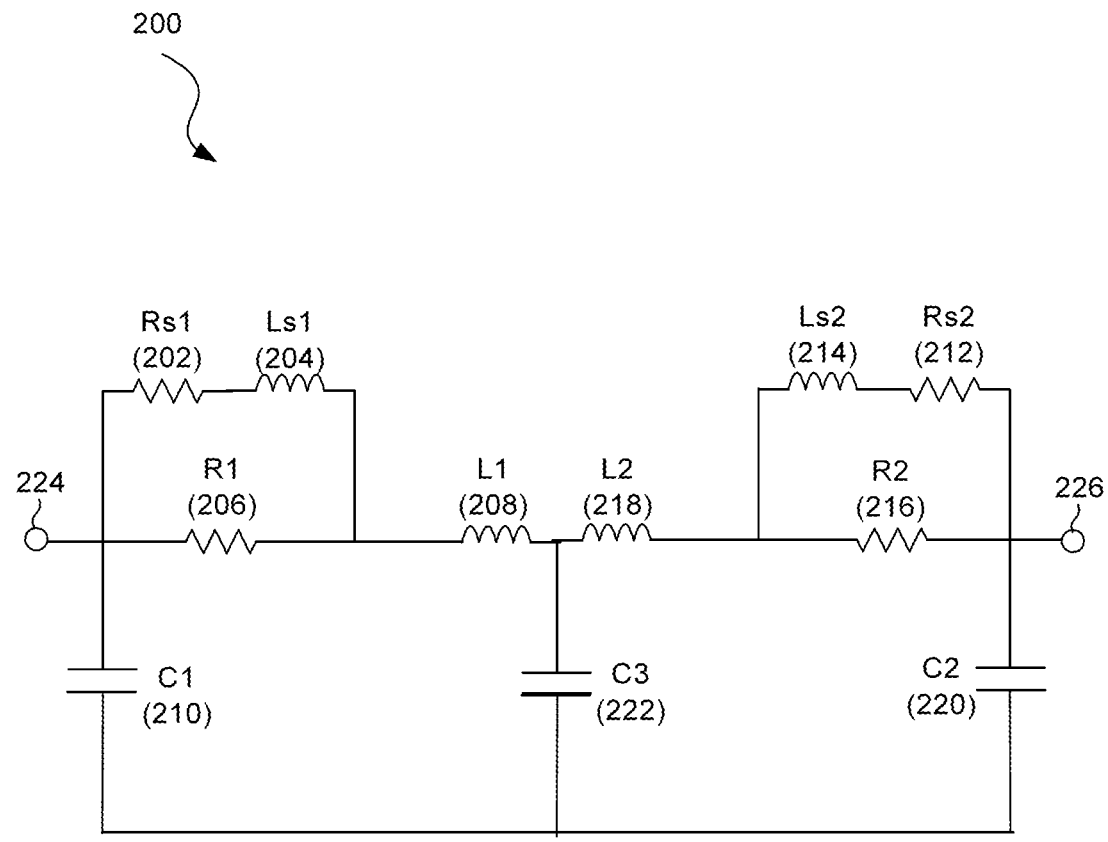
FIG. 2 is a diagram showing an illustrative lumped transmission line model with shielding, according to one example of principles described herein.

FIG. 2 is a diagram showing an illustrative symmetric lumped transmission line model 200 with shielding. Some substrates and semiconductor devices include a layer of shielding that protects the metal interconnects from the intrinsic substrate effects. Specifically, the substrate will typically have a resistance and an inductance that affects the characteristics of the metal interconnects. Because there is a shielding layer, those effects are not represented within the lumped transmission line model 200.

As illustrated, the interconnect is represented by a set of circuit components between two ports 224, 226. The first half has a main resistance 206 indicated by R1, a main inductance 208 indicated by L1 and a main capacitance 210 indicated by C1. Likewise, the second half has a main resistance 216 indicated by R2, a main inductance 218 indicated by L2 and a main capacitance 220 indicated by C2. C3 222 indicates the combined capacitance of C1 and C2. The capacitance C3 222 is primarily the capacitance resulting from the oxide layer formed between a metal layer and a semiconductor substrate.

The symmetric lumped transmission line model also factors in the skin effect. When alternating electric current flows through a conductor such as a metal interconnect, the current distribution is not uniform through the conductor. Specifically, the electric current tends to be larger towards the edges of the conductor. Moreover, the skin effect changes as a function of frequency. For example, the resistance tends to become greater at higher frequencies. The skin effect is modeled by having a skin resistance 202, indicated by Rs1, in series with a skin inductance 204, indicated by Ls1. The series is in parallel with the main resistance 206. The second half of the model also includes a skin effect as indicated by Ls2 214 and Rs2 212.

Figure 3:
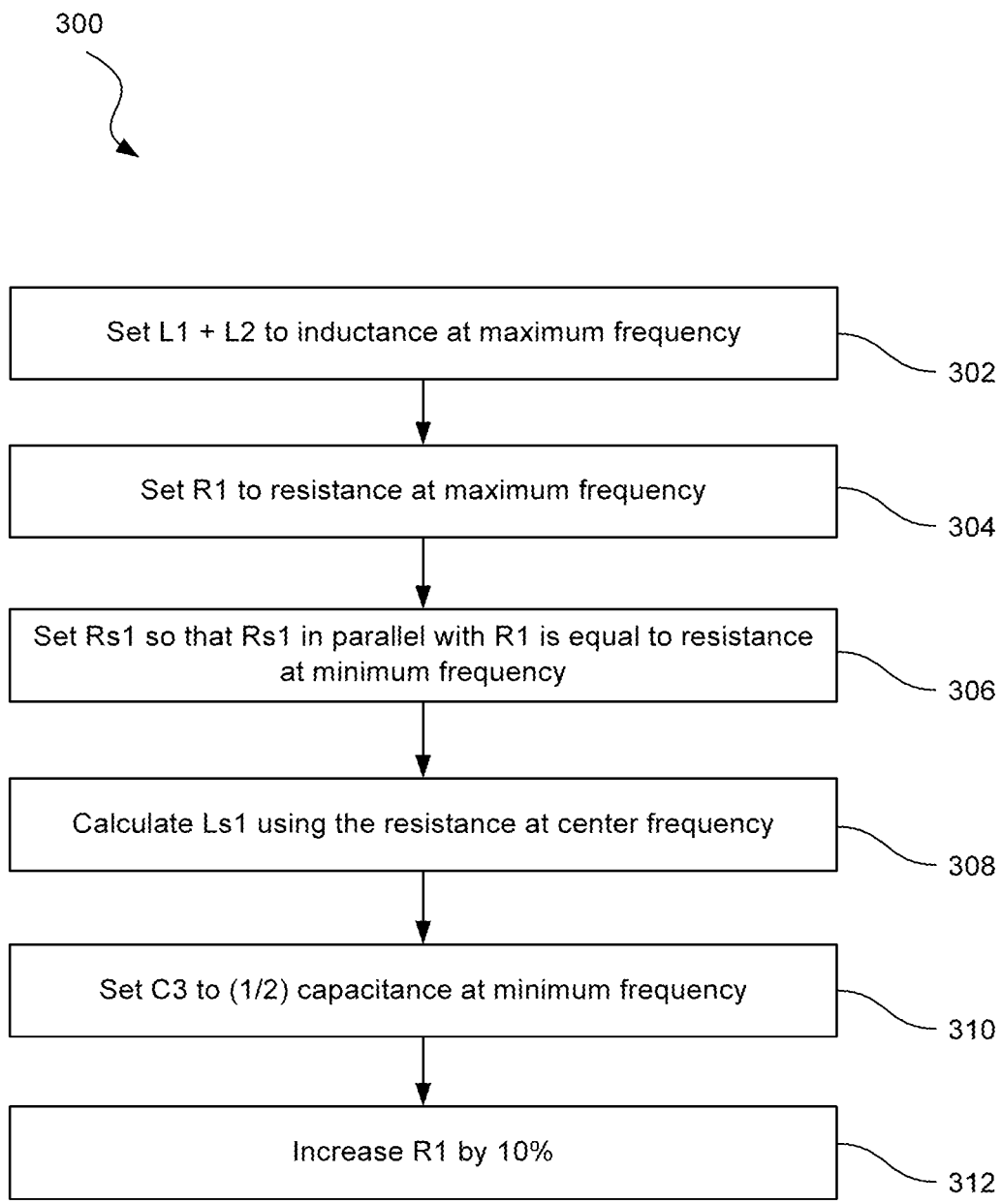
FIG. 3 is a flowchart showing an illustrative method for setting values for the lumped transmission line model with shielding, according to one example of principles described herein.

FIG. 3 is a flowchart showing an illustrative method for setting values for the lumped transmission line model with shielding. As mentioned above, the values for the components within the symmetric lumped transmission line model can be set in part by values obtained from the database. The manner in which the values from the database can be used to define values for the model 200 will now be described.

According to the present example, L1 and L2 are set to be of equal values. Moreover, L1 and L2 are set 302 so that the sum of L1 and L2 is equal to the inductance taken from the database at maximum frequency to be simulated. For example, if the transmission line model is to simulate the metal interconnect at a frequency range of 0.2 Ghz to 30 Ghz, then the maximum frequency is 30 Ghz. Specifically, a metal interconnect with similar physical parameters as extracted by the extraction tool is found in the database. The database will also indicate an inductance value at 30 Ghz. This is the value to which L1+L2 is set.

According to the present example, R1 is set 304 to the resistance taken from the database at the maximum frequency. Using the example of a simulation range between 0.2 Ghz and 30 Ghz, R1 is set to the resistance of the metal interconnect from the database at 30 Ghz. Additionally, R2 is set to be equal to R1.

According to the present example, Rs1 is set 306 so that Rs1 in parallel with R1 is equal to the resistance taken from the database at the minimum frequency. Using the example of a simulation range between 0.2 Ghz and 30 Ghz, Rs1 is set so that Rs1 in parallel with R1 is equal to the resistance of the metal interconnect from the database at 0.2 Ghz. Those skilled in the relevant art are aware of the equations for calculating resistances in parallel. Thus, a discussion of such equations will not be given here.

According to the present example, Ls1 is calculated 308 using the resistance from the database at the center frequency to be simulated, in this example, approximately 15 Ghz. Specifically, Ls1 may be calculated using the following equation, which indicates the real part only:

$$[w^2*Ls1^2*R1+(R1+Rs1)*R1*R11]/[(R1+Rs1)*(R1+Rs1)+w^2*Ls1^2]=R_{DAT}$$

Where:

$R_{DAT}$=the resistance from the database at center frequency; and w=2*pi*(center frequency to be simulated);

Additionally, Rs2 is set to be equal to Rs1. Likewise, Ls2 is set to be equal to Ls1.

According to the present example, C3 is set 310 to be equal to one half of the capacitance taken from the database at the minimum frequency. Additionally, C1 is equal to C2 and C1 plus C2 is equal to C3.

As mentioned above, certain adjustments are made to the model to increase the efficiency and accuracy of the model. According to certain illustrative examples, R1 is increased by a factor within a range of about 1.05 to 1.3. R2 is likewise increased. For example, R1 and R2 can be increased by approximately 10%. Doing so provides a better fit for the transmission line model described herein with actual measured results.

Figure 4:
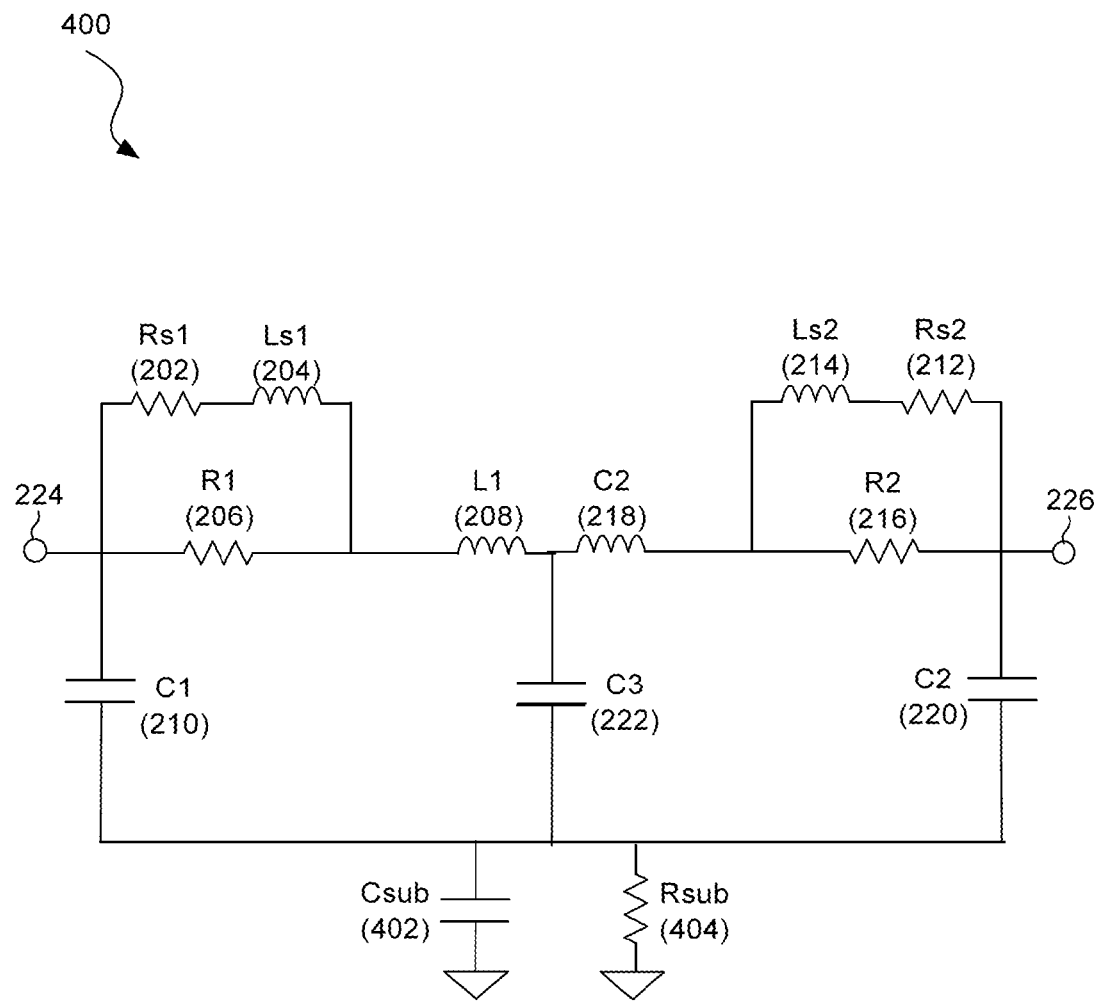
FIG. 4 is a diagram showing an illustrative lumped transmission line model without shielding, according to one example of principles described herein.

FIG. 4 is a diagram showing an illustrative lumped transmission line model without shielding. As mentioned above, some metal interconnects are unshielded and thus modeling of those interconnects should factor in the substrate effects. Specifically, the substrate effects add a substrate resistance 402 and a substrate capacitance 404. The remaining components are similar to those described in FIG. 2.

Figure 5:
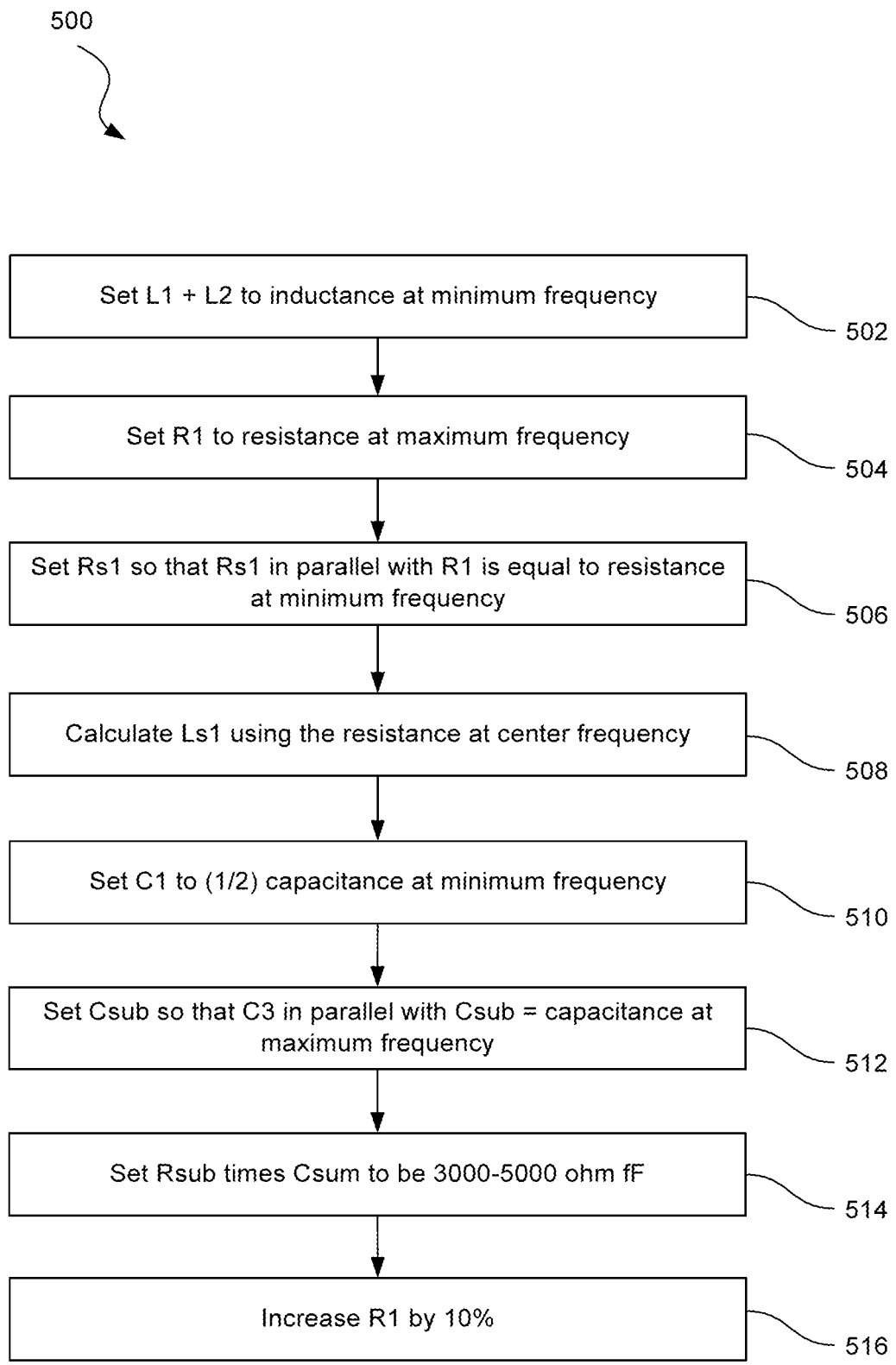
FIG. 5 is a flowchart showing an illustrative method for setting values for the lumped transmission line model without shielding, according to one example of principles described herein.

FIG. 5 is a flowchart showing an illustrative method for setting values for the lumped transmission line model without shielding. As mentioned above, the values for the components within the symmetric lumped transmission line model can be set in part by values obtained from the database. The manner in which the values from the database can be used to define values for the model 200 will now be described.

According to the present example, L1 and L2 are set to be of equal values. Moreover, L1 and L2 are set 502 so that the sum of L1 and L2 is equal to the inductance taken from the database at the minimum frequency to be simulated. For example, if the transmission line model is to simulate the metal interconnect at a frequency range of 0.2 Ghz to 30 Ghz, then the minimum frequency is 0.2 Ghz. Specifically, a metal interconnect with similar physical parameters as extracted by the extraction tool is found in the database. The database will also indicate an inductance value at 0.2 Ghz. This is the value to which L1+L2 is set.

According to the present example, R1 is set 304 to the resistance taken from the database at the maximum frequency. Using the example of a simulation range between 0.2 Ghz and 30 Ghz, R1 is set to the resistance of the metal interconnect from the database at 30 Ghz. Additionally, R2 is set to be equal to R1.

Like with the shielded method, Rs1 is set 506 so that Rs1 in parallel with R1 is equal to the resistance taken from the database at minimum frequency. Ls1 is also calculated 508 as described above. Moreover, like with the shielded method, C3 is set 510 to ½ the capacitance from the database at minimum frequency.

According to the present example the capacitance of the substrate, Csub, is set 512 so that C3 in parallel with Csub is equal to the capacitance taken from the database at the maximum frequency. The substrate resistance, Rsub, is set 514 to be such that Rsub times Csub is equal to a defined value within a range from about 100 to 6000 ohm femtofarads, which may include the high resistive silicon substrate. Specifically, the value may be set at about 4000 ohm femtofarads. This value is based on the intrinsic characteristics of standard substrate materials. Modeling the substrate effects in such a manner provides for efficiency while remaining accurate.

Again, R1 is increased by a factor within a range of about 1.05 to 1.3. R2 is likewise increased. For example, R1 and R2 can be increased by approximately 10%. Doing so provides a better fit for the transmission line model described herein with actual measured results.

Figure 6:
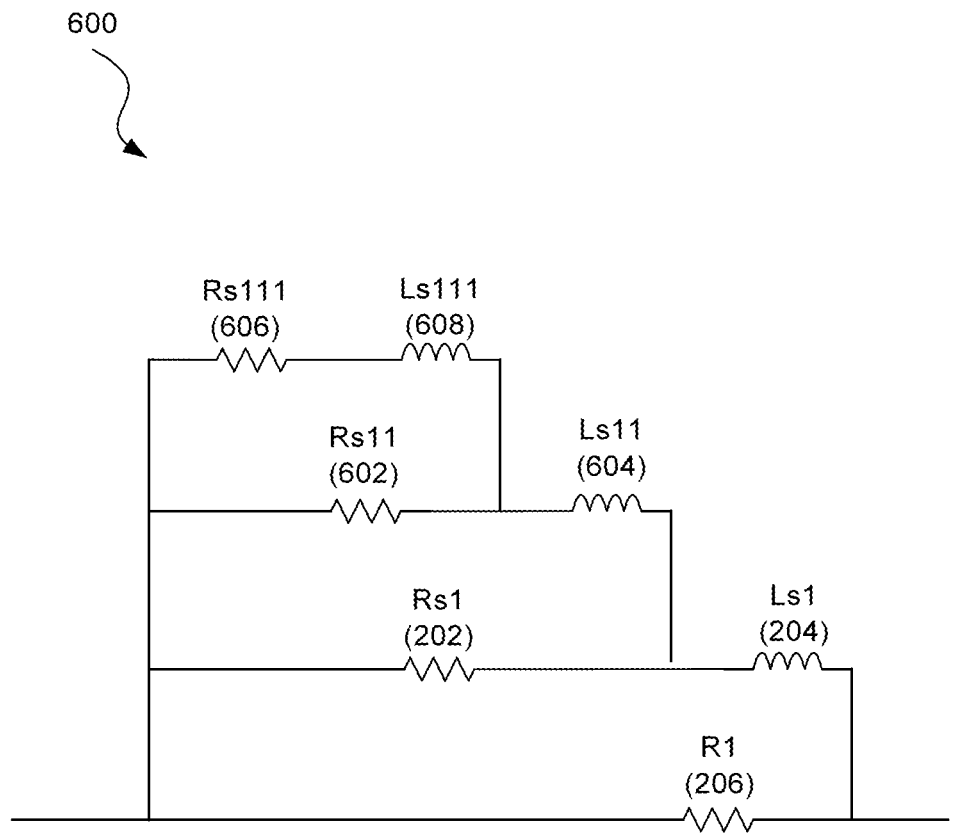
FIG. 6 is a diagram showing a recursive skin effect model, according to one example of principles described herein.

FIG. 6 is a diagram showing a recursive skin effect model 600. As mentioned above, the lumped transmission line model may account for skin effects by placing a skin resistance 202 in series with a skin inductance 204, the series being in parallel with the main resistance 206. To allow the model to be more accurate for higher frequencies, the skin effect may be modeled in a recursive manner.

Specifically, an additional skin resistance 602 may be placed in series with an additional skin inductance 604. This series is in parallel with the original skin resistance 202. Modeling the skin resistance as such may allow for more accurate modeling up to 60 Ghz. The additional skin effect inductance 604 may be calculated using the equation described above. Except, the frequency used in the calculation is half of the sum of the minimum frequency to be simulated and the center frequency to be simulated. Additionally, Rs11 602, is set to the original value of Rs1 202. Rs1 202 is then set to the resistance taken from the database at center frequency.

To further expand the bandwidth, this process of adding an additional skin effect loop can be performed recursively. Specifically, a further skin effect resistance, Rs111 606 may be added in series with a further skin effect inductance, Ls111 608. This series is in parallel with the additional skin effect resistance, Rs11 602. Rs111 and Ls111 may be calculated as described above for Rs11 and Ls11. Doing so may allow the model to be more accurate for up to a bandwidth of 200 Ghz.

As mentioned above, after all of the components of the lumped transmission line model have been defined, the model can be simulated over the desired frequency range. Various tools such as HSPICE, SPECTRE, and ELDO are available to perform such simulations. Such simulations may be modeled using S-parameters. Using methods described herein of constructing the model and defining values for components within the model, a quick and efficient method of modeling can be achieved.

Figure 7:
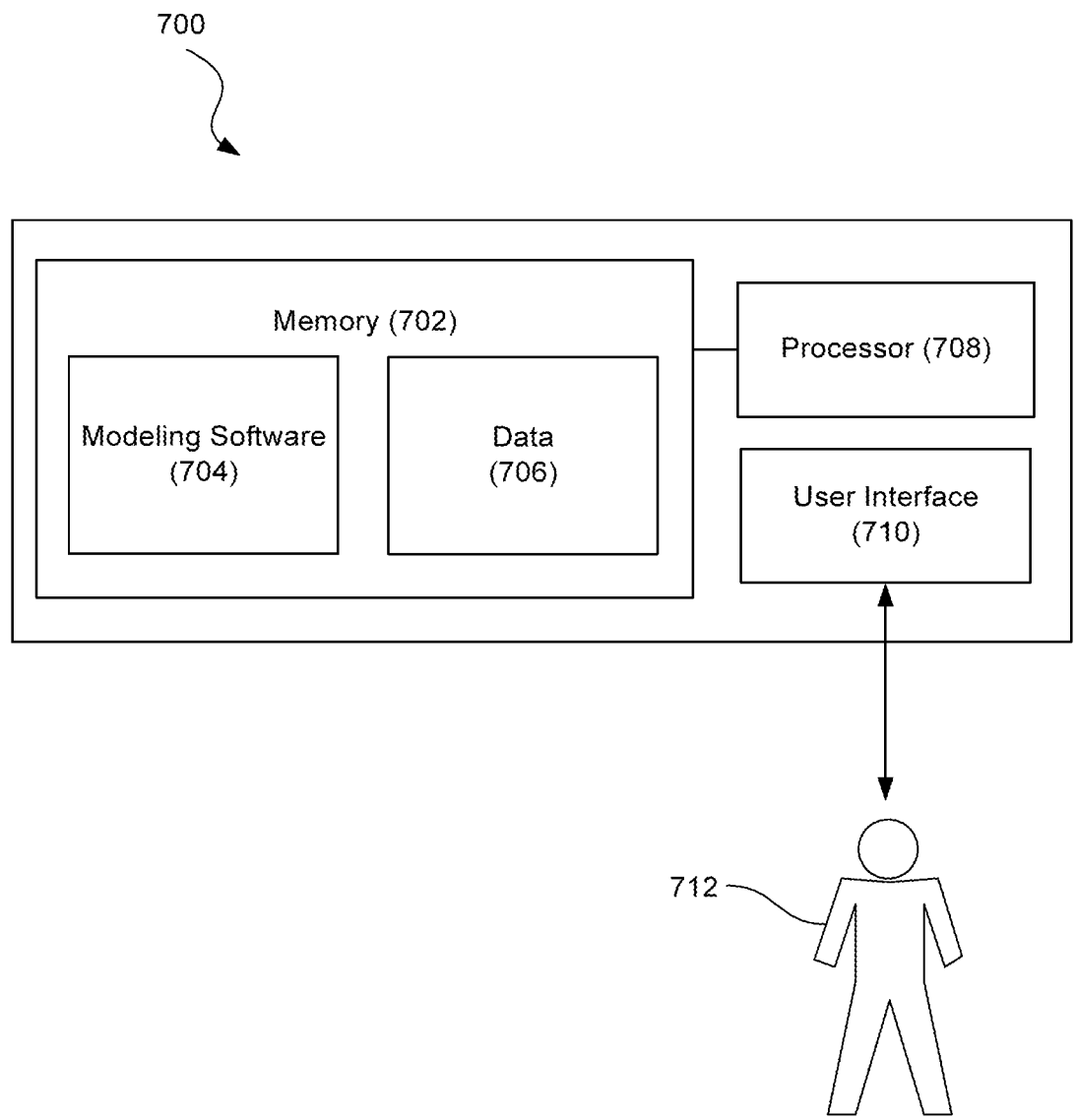
FIG. 7 is a diagram showing an illustrative computer system that may be used to model metal interconnects, according to one example of principles described herein.

FIG. 7 is a diagram showing an illustrative computer system that may be used to model metal interconnects. According to certain illustrative examples, the physical computing system 700 includes a memory 702 having modeling software 704 and data 706 stored thereon. The physical computing system 700 also includes a processor 708 and a user interface 710.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 704 and data 706.

The physical computing system 700 also includes a processor 708 for executing the software 704 and using or updating the data 706 stored in memory 702. In addition to storing the modeling software 704, the memory 702 may store an operating system. An operating system allows other applications to interact properly with the hardware of the physical computing system. The modeling software 704 may include the tools to form the lumped transmission line model and define the values of the components therein.

A user interface 710 may provide a means for a user 712 to interact with the system. The user may use various tools such as a keyboard or a mouse to input information into the physical computing system. Additionally, various output devices such as a monitor may be used to provide information to the user 712.

Figure 8:
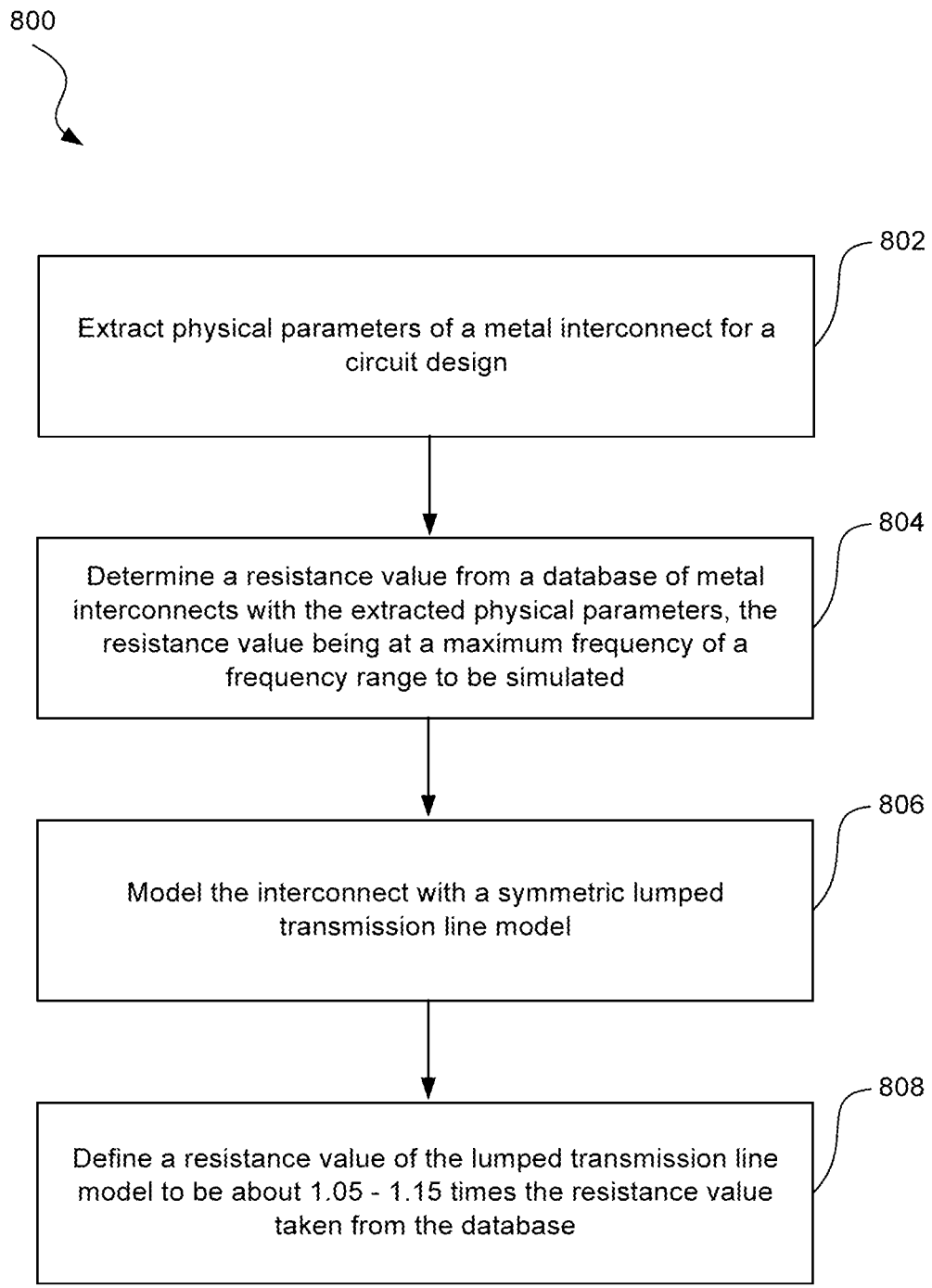
FIG. 8 is a flowchart showing an illustrative method for modeling metal interconnects, according to one example of principles described herein.

FIG. 8 is a flowchart showing an illustrative method for modeling metal interconnects. According to certain illustrative examples, the method includes a step of extracting 802 physical parameters of a metal interconnect for a circuit design. The method further includes a step of determining 804 a resistance value from a database of metal interconnects with the extracted physical parameters, the resistance value being at a maximum frequency of a frequency range to be simulated. The method further includes a step of modeling 806 the interconnect with a symmetric lumped transmission line model. The method further includes a step of defining 808 a main resistance value of the lumped transmission line model to be about 1.05-1.3 times the resistance value taken from the database.

According to certain illustrative examples, a method for modeling metal routing includes extracting physical parameters of a metal interconnect for a circuit design, determining a resistance value from a database of metal interconnects with the extracted physical parameters, the resistance value being at a maximum frequency of a frequency range to be simulated, modeling the interconnect with a symmetric lumped transmission line model, and defining a resistance value of the lumped transmission line model to be about 1.05-1.3 times the resistance value taken from the database.

According to certain illustrative examples, a computing system for modeling metal routing includes a processor and a memory. The memory includes computer readable instructions that when executed by the processor, cause the system to extract physical parameters of a metal interconnect for a circuit design, compare the extracted physical parameters for the interconnect with a database of measured characteristics to determine a resistance value for the interconnect, the resistance value being at a maximum frequency of a frequency range to be simulated, model the interconnect with a symmetric lumped transmission line model, and define a resistance value of the lumped transmission line model to be the resistance value obtained from the database multiplied by a factor within a range of about 1.05-1.3.

According to certain illustrative examples, a method for modeling metal routing includes extracting physical parameters of a metal interconnect for a circuit design, performing a comparison of the extracted physical parameters for the metal interconnect with a database of measured characteristics of metal interconnects of varying parameters at varying frequencies, defining a resistance value for a symmetric lumped transmission line model based on the comparison, adjusting the resistance value of the lumped transmission line model to be increased by about 10 percent, and performing a simulation of the lumped transmission line model using s-parameters.

It is understood that various different combinations of the above-listed embodiments and steps can be used in various sequences or in parallel, and there is no particular step that is critical or required. Additionally, although the term "electrode" is used herein, it will be recognized that the term includes the concept of an "electrode contact." Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method performed by a computing system for modeling metal routing in a circuit design, the method comprising:
    extracting physical parameters of a metal interconnect for the circuit design;
    determining a resistance value from a database of metal interconnects with the extracted physical parameters, the resistance value being at a maximum frequency of a frequency range to be simulated;
    modeling the interconnect with a symmetric lumped transmission line model;
    defining an adjusted resistance value to be about 1.05-1.3 times the resistance value from the database; and
    simulating the symmetric lumped transmission line model across the frequency range using the adjusted resistance value as a main resistance value of the symmetric lumped transmission line model.

2. The method of claim 1, wherein simulating the symmetric lumped transmission line model comprises using S-parameters.

3. The method of claim 1, wherein the interconnect is a shielded interconnect.

4. The method of claim 3, wherein a skin inductance is defined by the inductance extracted from the physical parameters at a frequency equal to half the sum of the minimum frequency to be simulated and the center frequency to be simulated.

5. The method of claim 3, further comprising defining both inductances of the symmetric lumped transmission line model as the inductance extracted from the physical parameters at a maximum frequency to be simulated.

6. The method of claim 1, wherein the interconnect is an unshielded interconnect.

7. The method of claim 6, wherein the substrate resistance and substrate capacitance for the lumped transmission line model are defined such that a multiple of the substrate resistance and the substrate capacitance is within a range of about 100-6000 ohm femtofarads.

8. The method of claim 7, wherein the multiple is about 4000 ohm femtofarads.

9. The method of claim 6, further comprising defining both inductances of the symmetric lumped transmission line model as the inductance extracted from the physical parameters at a minimum frequency to be simulated.

10. The method of claim 1, wherein the adjusted resistance value is defined to be about 1.1 times the resistance value from the database.

11. The method of claim 1, wherein the transmission line model includes a skin effect model that comprises a skin resistance and a skin inductance in series, the series being in parallel with the main resistance.

12. The method of claim 11, wherein for models that are to be simulated on a wider band, the skin effect model comprises an additional skin resistance in series with an additional skin inductance, the series being in parallel to the skin resistance.

13. The method of claim 12, in which the skin inductance is set based on a calculation using a frequency that is half of the sum of the minimum frequency to be simulated and the center frequency to be simulated.

14. A computing system for modeling metal routing, the system comprising:
    a processor; and
    a memory including computer readable instructions that when executed by the processor, cause the system to:
        extract physical parameters of a metal interconnect for a circuit design;
        compare the extracted physical parameters for the interconnect with a database of measured characteristics to determine a resistance value for the interconnect, the resistance value being at a maximum frequency of a frequency range to be simulated;
        model the interconnect with a symmetric lumped transmission line model;
        define an adjusted resistance value to be the resistance value obtained from the database multiplied by a factor within a range of about 1.05-1.3; and
        simulate the symmetric lumped transmission line model across the frequency range using the adjusted resistance value as a main resistance value of the symmetric lumped transmission line model.

15. The system of claim 14, wherein the interconnect is a shielded interconnect.

16. The system of claim 15, wherein a skin inductance is defined by the inductance extracted from the physical parameters at a frequency equal to half the sum of the minimum frequency to be simulated and the center frequency to be simulated.

17. The system of claim 15, wherein the computer readable instructions further cause the processor to define both inductances of the symmetric lumped transmission line model as the inductance extracted from the physical parameters at a maximum frequency to be simulated.

18. The system of claim 14, wherein the interconnect is an unshielded interconnect.

19. The system of claim 18, wherein the substrate resistance and substrate capacitance for the lumped transmission line model are defined such that a multiple of the substrate resistance and the substrate capacitance is within a range of about 100-6000 ohm femtofarads.

20. A method for modeling metal routing, the method performed by a computing system, the method comprising:
- extracting physical parameters of a metal interconnect for a circuit design;
- performing a comparison of the extracted physical parameters for the metal interconnect with a database of measured characteristics of metal interconnects of varying parameters at varying frequencies;
- defining a resistance value for a symmetric lumped transmission line model based on the comparison;
- adjusting the resistance value of the lumped transmission line model to be increased by about 10 percent;
- simulating the lumped transmission line model using s-parameters; and the adjusted resistance value; and
- producing a circuit design based on the simulation.

* * * * *